United States Patent [19]

Phillips

[11] Patent Number: 4,750,849
[45] Date of Patent: Jun. 14, 1988

[54] METHOD AND APPARATUS FOR MILLING

[75] Inventor: James D. Phillips, Posen, Mich.

[73] Assignee: J. D. Phillips Corporation, Alpena, Mich.

[21] Appl. No.: 1,343

[22] Filed: Jan. 8, 1987

[51] Int. Cl.$^4$ .............................................. B23C 3/34
[52] U.S. Cl. ...................... 409/131; 407/61;
    409/71; 409/138; 409/165; 409/190; 409/203
[58] Field of Search ............... 409/71, 131, 132, 138,
    409/165, 166, 167, 168, 190, 192, 203, 213, 217;
    82/2 E; 407/58, 60, 61

[56] References Cited

U.S. PATENT DOCUMENTS

| | | | |
|---|---|---|---|
| 2,188,456 | 1/1940 | Galber | 409/71 |
| 3,701,187 | 10/1972 | Erkfritz | 407/58 |
| 3,888,161 | 6/1975 | Baudermann | 409/203 |
| 4,012,992 | 3/1977 | Smrekar et al. | 409/167 |
| 4,329,192 | 5/1982 | White, Jr. et al. | 409/165 |

Primary Examiner—Neil Abrams
Attorney, Agent, or Firm—Barnes, Kisselle, Raisch, Choate, Whittemore & Hulbert

[57] ABSTRACT

A method and apparatus for cutting a pair of circular grooves in the side edges of the periphery of a circular disk such, for example, as the stator of an alternator. A milling cutter having axially spaced cutting elements along its periphery is positioned so that its axis is parallel to the axis of the disk. The cutter is moved toward the disk while being axially rotated, to cause the cutting elements to cut into the side edges of the periphery of the disk. The disk is then rotated one full turn to cause the cutting elements to cut the grooves.

7 Claims, 2 Drawing Sheets

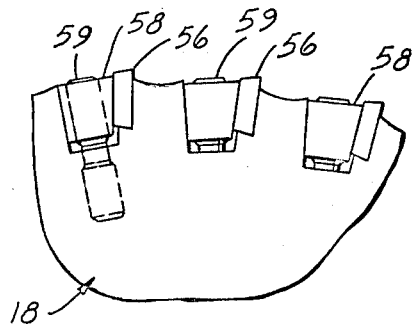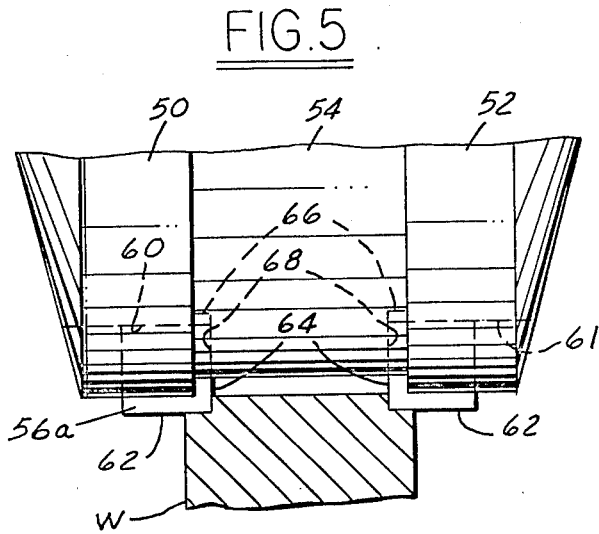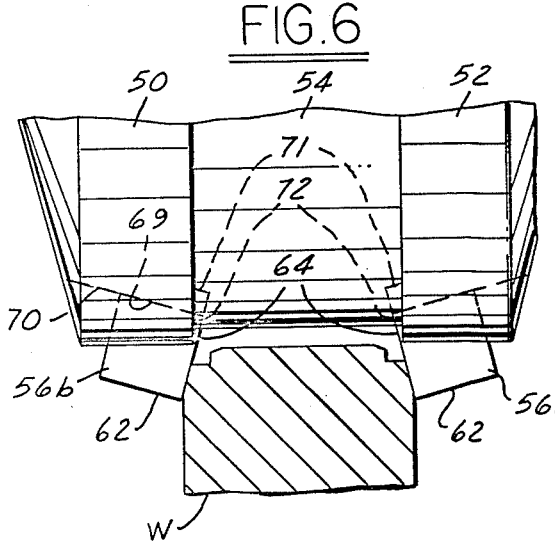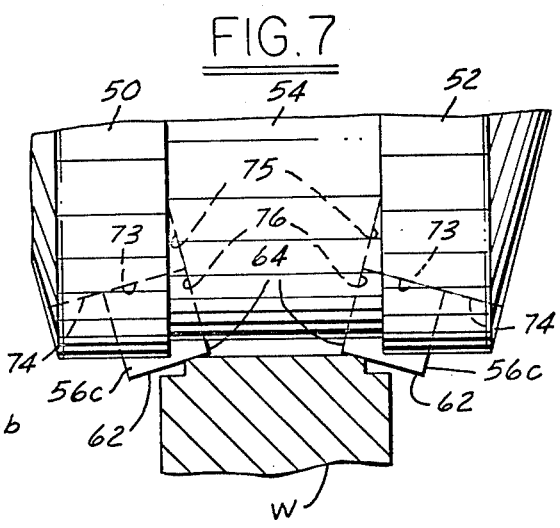

METHOD AND APPARATUS FOR MILLING

This invention relates generally to removal of stock from workpieces and refers more particularly to a method and apparatus for cutting a pair of axially spaced circular grooves in the side edges of the periphery of a circular disk such, for example, as an alternator.

BACKGROUND AND SUMMARY OF THE INVENTION

It is standard practice to cut a circular groove with a single point tool fed slowly into a workpiece as the workpiece is rotated at high speed. This present day method is time-consuming and, since all of the cutting is done by a single cutting element, requires frequent replacement of the cutting element.

In accordance with this invention, the groove is cut by means of a milling cutter. The workpiece remains stationary and the cutter, rotating at high speed, is feed into the workpiece to full groove depth. Then, with the cutter continuing to rotate at high speed, the workpiece is turned once 360° at a relatively slow speed to completely mill a circular groove.

More specifically, the milling cutter comprises a pair of circular cutter bodies clamped to opposite sides of a spacer. Each cutter body has circumferentially spaced slots in its periphery in which cutting elements are mounted. The cutting elements are capable of simultaneously cutting a pair of axially spaced grooves in the side edges of the periphery of a circular disk such, for example, as the stator of an alternator for an automobile. Some of the cutting elements are notching elements which cut grooves, while others are chamfering elements. Of the chamfering elements, some cut a chamfer on the side edges of the grooves and others cut a chamber on the radially outer edges of the grooves.

These and other objects of the invention will become more apparent as the following description proceeds, especially when considered with the accompanying drawings.

BRIEF DESCRIPTION OF THE DRAWINGS

FIG. 4 is an enlarged view of a portion of FIG. 3.

FIG. 5 is an enlarged view of a portion of FIG. 2 showing the notching cutting elements of the milling cutter cutting grooves in the workpiece.

FIGS. 6 and 7 are similar to FIG. 5, but show the chamfering cutting elements.

DETAILED DESCRIPTION

Figure 1:
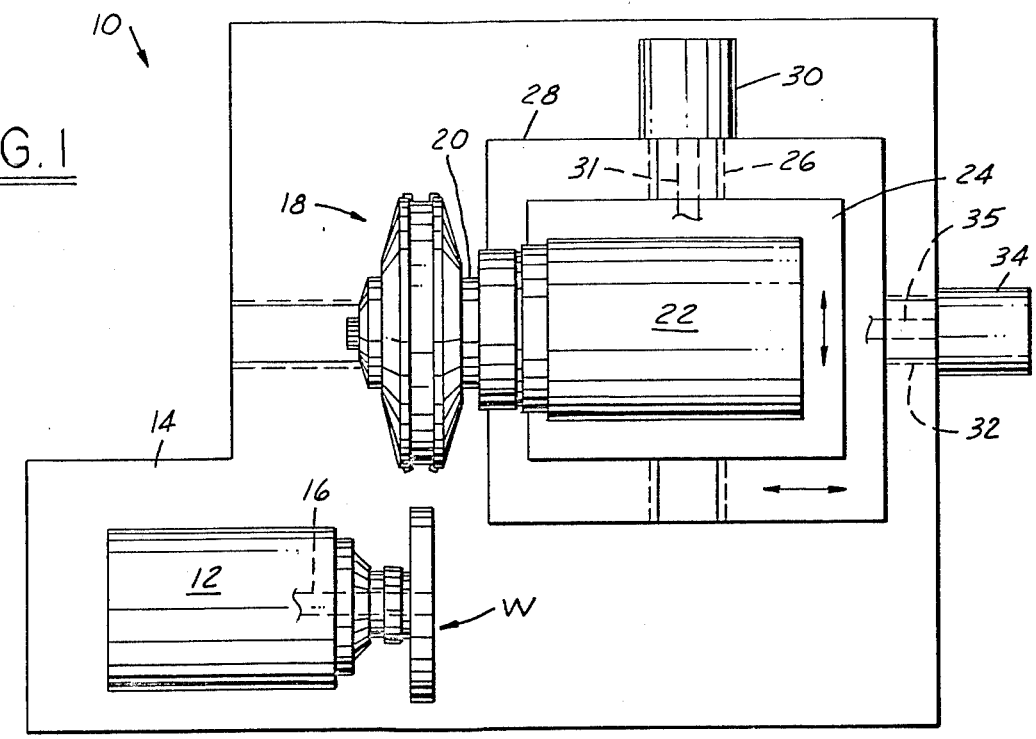
FIG. 1 is a top plan view of apparatus for practicing the method of the invention.
Figure 3:
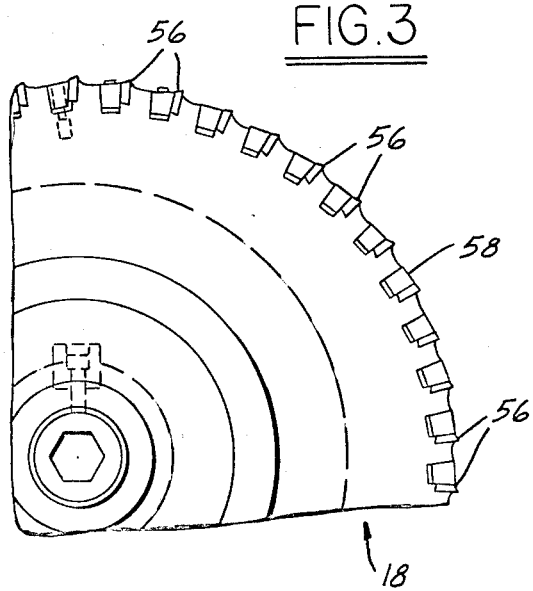
FIG. 3 is a side view of a portion of the milling cutter.
Figure 2:
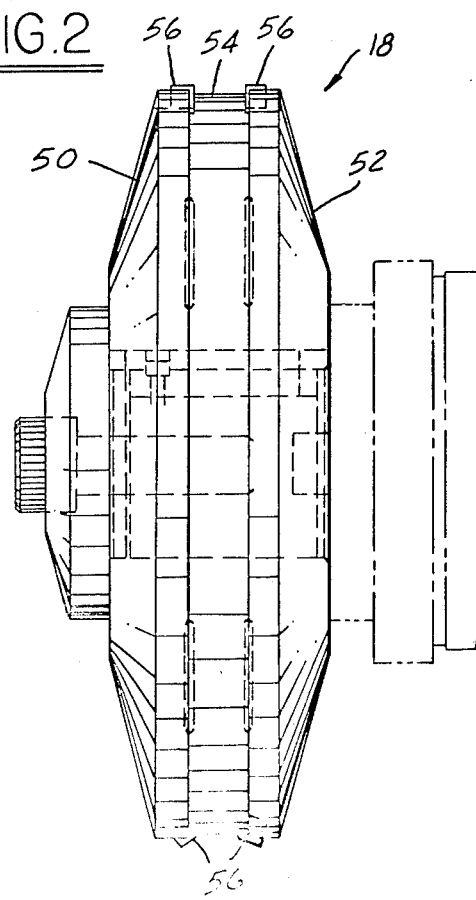
FIG. 2 is an enlarged elevational view of the milling cutter shown in FIG. 1.

Referring now more particularly to the drawings, the numeral 10 designates a milling machine having a head stock 12 mounted on a base 14 and including a motor drive for turning a work spindle 16. The spindle 16 is adapted to mount a circular disk W, in this instance a steel stator which is a component of the alternator in an automobile. A circular milling cutter 18 is mounted on the shaft 20 of motor drive 22 which rotates the shaft and also the milling cutter. Shaft 20 is parallel to work spindle 16.

The motor drive 22 is mounted on a table 24 which in turn is mounted on ways 26 of a slide 28 for movement of the table in opposite directions in a path at right angles to the axis of the work spindle 16. The table 24 is moved by a reversible motor 30 and ball screw drive 31.

The slide 28 is mounted on ways 32 of a lateral extension of the base 14 for sliding movement in opposite directions parallel to the axis of the work spindle 16. The slide is moved in opposite directions by a reversible motor 34 and ball screw drive 35.

The milling cutter comprises a pair of circular coaxial cutter bodies 50 and 52 and a circular spacer 54 sandwiched between the cutter bodies. The cutter bodies and spacer are secured together to rotate as a unit by any suitable means.

Each cutter body has a multiplicity of rectangular cutting elements 56 equally spaced apart along it periphery. The number of cutting elements 56 may vary, but in the specific embodiment herein disclosed, there are forty five such cutting elements around the periphery of each cutter body, thirty five of which are notching cutting elements 56a and ten of which are chamfering cutting elements 56b and 56c.

The cutting elements are secured in radial slots which extend completely across the periphery of the cutter bodies. Each cutting element is secured in position by a wedge 58 held in place by a set screw 59.

The notching cutting elements 56a are best shown in FIG. 5. The bottoms 60 of the slots 61 for these notching cutting elements 56a are parallel to the axis of rotation of the cutter. The radially inner edges of the cutting elements 56a seat upon the bottoms 60 of these slots. The radially outer cutting edges 62 of the cutting elements 56a project outwardly beyond the periphery of the cutter bodies. The laterally inner cutting edges 64 of the cutting elements 56a extend into registering recesses 66 in the spacer and seat against the radially disposed bottoms 68 of these recesses. The outer edges 62 of the cutting elements 56a are parallel to the axis of rotation of the cutter and the laterally inner edges are disposed radially, that is, at right angles to the axis of rotation of the cutter.

The chamfering cutting elements 56b are best shown in FIG. 6. The bottoms 69 of the slots 70 for the chamfering cutting elements 56b are inclined so as to extend from the spacer along a line which intersects the axis of rotation of the cutter. The radially inner edges of the cutting elements 56a seat upon the bottoms 69 of their slots. The radially outer cutting edges 62 of the cutting elements 56b project outwardly beyond the periphery of the cutter bodies but are inclined at the same angle as the slot bottoms. The laterally inner cutting edges 64 of the cutting elements 56b project into registering recesses 71 in the spacer and seat against the slanted bottoms 72 of the recesses 71. The bottoms of these recesses are cut at right angles to the bottoms 69 of the slots 70. Thus the laterally inner edges 64 of the cutting elements 56b are at right angles to the bottoms 69 of the slots 70.

The chamfering cutting elements 56c are best shown in FIG. 7. The bottoms 73 of the slots 74 for the chamfering cutting elements 56c are inclined so as to extend from the spacer along a line which diverges from the axis of rotation of the cutter. The radially inner edges of the cutting elements 56c seat upon the bottoms 73 of their slots. The radially outer cutting edges 62 of the cutting elements 56c project outwardly beyond the periphery of the cutter bodies but are inclined at the same angle as the slot bottoms. The laterally inner cutting edges 64 of the cutting elements 56c project into registering recesses 75 in the spacer and seat against the slanted bottoms 76 of the recesses 75. The bottoms of these recesses are cut at right angles to the bottoms 73 of the slots 74. Thus the laterally inner edges 64 of the cutting elements 56c are at right angles to the bottoms 73 of slots 74.

As pointed out above, the laterally inner edges 64 of the notching cutting elements 56a seat against the laterally disposed bottoms 68 of the recesses 66 in the spacer 54. The laterally inner edges 64 of the chamfering cutting elements 56b seat against the bottoms 72 of the recesses 71 in the spacer 54. The laterally inner edges 64 of the chambering cutting elements 56c seat against the bottoms 76 of the recesses 75 in the spacer 54. Therefore, it does not matter whether the width dimension of the cutting elements 56a, 56b and 56c varies slightly since the laterally inner cutting edges 64 are accurately positioned by the bottoms of the recesses in the spacer 54.

In operation, a circular disk W, in this instance the steel stator of an automobile alternator, is secured on the work spindle 16 so that its axis coincides with that of the work spindle. The work spindle is initially held stationary.

Then the milling cutting 18, driven by the motor drive 22 at high speed, for example, 200 revolutions per minute (RPM) or 600 surface feet per minute (SFPM), is moved relative to the stator W by the operation of motor 34 to the position shown in FIG. 1. Thereafter, by operation of motor 30, the rotating milling cutter is moved at right angles to its axis of rotation and fed into the stationary stator W to full groove depth. FIGS. 5, 6 and 7 show this full depth position of the milling cutter. In this position, the cutting edges 62 and 64 of the cutting elements 56a cut L-shaped recesses in the side edges of the periphery of the stator. These recesses are chamfered by the chamfering cutting elements 56b and 56c, the laterally inner cutting edges 64 of the chamfering cutting elements 56b forming a chamfer on the corners of the recesses along the two opposite sides of the stator and the radially outer cutting edges 62 of the chamfering cutting inserts 56c forming a chamfer on the corners of the recesses along the periphery of the stator.

Thereafter, and with the milling cutter continuing to rotate, the stator W is rotated relatively slowly 360°, or one full turn, at a speed, for example, of 20 RPM to mill chamfered grooves at the two sides edges of the stator periphery completely around its circumference. The grooves thus milled in the stator have the generally L-shaped configuration shown in FIG. 5, but with chamfered edges as will be apparent in FIGS. 6 and 7. The milling cutter 18 is then withdrawn clear of the stator W by reverse operation of motor 30 and the operation is complete.

I claim:

1. A method of cutting a pair of axially spaced circular grooves in the side edges of the periphery of a circular disk such, for example, as the stator of an alternator, comprising providing a circular milling cutter having axially spaced, first and second series of circumferentially spaced cutting elements along its periphery, positioning said disk and said milling cutter with their axes generally parallel, axially rotating said milling cutter, relatively moving said disk and axially rotating milling cutter toward one another to cause the cutting elements of both series of cutting elements of said axially rotating milling cutter to cut into the side edges of the periphery of said disk, and axially rotating said disk one full turn to cause the cutting elements of both series of cutting elements of said axially rotating milling cutter to cut a pair of grooves in the side edges of the periphery of said disk, said milling cutter having chamfering cutting elements along its periphery for chamfering at least one corner of each groove.

2. A method of cutting a pair of axially spaced circular grooves in the side edges of the periphery of a circular disk such, for example, as the stator of an alternator, comprising providing a circular milling cutter having axially spaced, first and second series of circumferentially spaced cutting elements along its periphery, positioning said disk and said milling cutter with their axes generally parallel, axially rotating said milling cutter, relatively moving said disk and axially rotating milling cutter toward one another to cause the cutting elements of both series of cutting elements of said axially rotating milling cutter to cut into the side edges of the periphery of said disk, and axially rotating said disk one full turn to cause the cutting elements of both series of cutting elements of said axially rotating milling cutter to cut a pair of grooves in the side edges of the periphery of said disk, said milling cutter having chamfering cutting elements along its periphery for cutting a chamfer on the side edge of each groove and for cutting a chamfer on the radilly outer edge of each groove.

3. Apparatus for cutting a pair of axially spaced grooves in the side edges of the periphery of a circular disk such, for example, as the stator of an alternator, comprising a circular milling cutter having axially spaced first and second series of circumferentially spaced cutting elements along its periphery, means supporting said disk and said milling cutter with their axes generally parallel, means for axially rotating said milling cutter, means for relatively moving said disk and axially rotating milling cutter toward one another to cause the cutting elements of both series of cutting elements of said milling cutter to cut into the side edges of the periphery of said disk, and means for axially rotating said disk one full turn to cause the cutting elements of both series of cutting elements of said axially rotating milling cutter to cut a pair of grooves in the side edges of the periphery of said disk, said cutter having radial slots in its periphery in which said cutting elements of both series are mounted, said slots having laterally outwardly facing surfaces providing abutments to axially locate said cutting elements.

4. Apparatus for cutting a pair of axially spaced grooves in the side edges of the periphery of a circular disk such, for example, as the stator of an alternator, comprising a circular milling cutter having axially spaced first and second series of circumferentially spaced cutting elements along its periphery, means supporting said disk and said milling cutter with their axes generally parallel, means for axially rotating said milling cutter, means for relatively moving said disk and axially rotating milling cutter toward one another to cause the cutting elements of both series of cutting elements of said milling cutter to cut into the side edges of the periphery of said disk, and means for axially rotating said disk one full turn to cause the cutting elements of both series of cutting elements of said axially rotating milling cutter to cut a pair of grooves in the side edges of the periphery of said disk, said cutter comprising a pair of circular coaxial cutter bodies and a circular spacer between said cutter bodies, means securing said cutter bodies and spacer together, each cutter body having circumferentially spaced slots in its periphery which open through the side thereof adjacent said spacer, the cutting elements of the first series being mounted in the slots of one of said cutter bodies and the cutting elements of the second series being mounted in the slots of the other of said cutter bodies, said spacer providing abutment surfaces for engaging and locating said cutting elements of both series.

5. Apparatus for cutting a pair of axially spaced grooves in the side edges of the periphery of a circular disk such, for example, as the stator of an alternator, comprising a circular milling cutter having axially spaced first and second series of circumferentially spaced cutting elements along its periphery, means supporting said disk and said milling cutter with their axes generally parallel, means for axially rotating said milling cutter, means for relatively moving said disk and axially rotating milling cutter toward one another to cause the cutting elements of both series of cutting elements of said milling cutter to cut into the side edges of the periphery of said disk, and means for axially rotating said disk one full turn to cause the cutting elements of both series of cutting elements of said axially rotating milling cutter to cut a pair of grooves in the side edges of the periphery of said disk, said cutter comprising a pair of circular coaxial cutter bodies and a circular spacer between said cutter bodies, means securing said cutter bodies and spacer together, each cutter body having circumferentially spaced slots in its periphery which open through the side thereof adjacent said spacer, the cutting elements of the first series being mounted in the slots on one of said cutter bodies and the cutting elements of the second series being mounted in the slots of the other of said cutter bodies, said spacer having recesses in both sides respectively registering with the slots in said cutter bodies, said cutting elements in the slots of both cutter bodies projecting in the registering recesses of said spacer and engaging the bottoms of said recesses to be laterally located thereby.

6. Apparatus defined in claim 5, wherein each cutter body has chamfering cutting elements in its periphery for corner-chamfering the groove cut by the first-mentioned cutting elements thereof.

7. Apparatus as defined in claim 6, wherein some of said chamfering cutting elements are positioned to cut a chamfer on the side edge of the groove and others are positioned to cut a chamfer on the radially outer edge thereof.

* * * * *